United States Patent
Huang et al.

(10) Patent No.: US 8,499,309 B2
(45) Date of Patent: Jul. 30, 2013

(54) APPLICATION EVENT HANDLING METHODS AND SYSTEMS

(75) Inventors: Jian Huang, Sudbury, MA (US); Fred C. Scheer, Bradford, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 23 days.

(21) Appl. No.: 13/246,399

(22) Filed: Sep. 27, 2011

(65) Prior Publication Data

US 2013/0081064 A1    Mar. 28, 2013

(51) Int. Cl.
*G06F 13/00*    (2006.01)
(52) U.S. Cl.
USPC .......................................................... 719/318
(58) Field of Classification Search
USPC .......................................................... 719/318
See application file for complete search history.

(56) References Cited

U.S. PATENT DOCUMENTS 7,350,066 B2 * 3/2008 Chen et al. ......................... 713/1
7,784,062 B2 * 8/2010 Droba ............................ 719/318

* cited by examiner

*Primary Examiner* — Andy Ho

(57) ABSTRACT

An exemplary method includes an application event handling system 1) detecting an occurrence of an event initiated by a user and associated with an application configured to be executed by a computing device, 2) determining, in response to the detecting, that another event previously initiated by the user and associated with the application is either already being processed by the computing device or already scheduled for processing by the computing device, 3) directing, in response to the determining, the computing device to ignore the previously initiated event, 4) scheduling, in response to the determining, the event to be processed by the computing device after a delay timer expires, and 5) starting, in response to the scheduling, the delay timer. Corresponding methods and systems are also disclosed.

19 Claims, 7 Drawing Sheets

APPLICATION EVENT HANDLING METHODS AND SYSTEMS

BACKGROUND INFORMATION

Computing devices are often required to handle (e.g., process) user-initiated events. For example, a computing device may detect a user-initiated event (e.g., a docking or undocking of the computing device with a host device) and automatically open an application associated with the user-initiated event, close an application associated with the user-initiated event, perform one or more initialization procedures associated with the user-initiated event, and/or otherwise perform one or more computing operations associated with the user-initiated event.

Processing of user-initiated events requires central processing unit ("CPU") and memory resources, which may be limited in some types of computing devices (e.g., mobile computing devices such as mobile phones and tablet computers). Hence, if a user initiates multiple events in rapid succession with respect to a resource-limited computing device (e.g., by repeatedly docking and undocking the computing device with a host device), the computing device may slow down, freeze, or even crash as it attempts to process each event.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Application event handling methods and systems are described herein. As will be described in more detail below, an application event handling system may detect an occurrence of an event initiated by a user and associated with an application configured to be executed by a computing device. In response, the application event handling system may detect whether another event previously initiated by the user and associated with the application is either already being processed by the computing device or already scheduled for processing by the computing device. If no other events are already being processed or are already scheduled for processing by the computing device, the application event handling system may direct the computing device to automatically and immediately begin processing the event.

If, however, the application event handling system determines that another event previously initiated by the user and associated with the application is either already being processed by the computing device or is already scheduled for processing by the computing device, the application event handling system may direct the computing device to ignore the previously initiated event (e.g., by terminating and/or canceling the processing of the previously initiated event). The application event handling system may then schedule the event to be processed by the computing device after a delay timer expires and, in response to the scheduling, start the delay timer.

If the delay timer expires without the application event handling system detecting an additional user-initiated event, the application event handling system may direct the computing device to begin the scheduled processing of the event. However, if an additional user-initiated event is detected while the delay timer is running (i.e., before the delay timer has expired), the application event handling system may cancel the scheduled processing of the event.

The methods and systems described herein may allow a computing device to more efficiently and effectively handle application events that are initiated by a user in rapid succession. For example, the methods and systems described herein may allow only the most recently initiated event associated with an application to be processed at any given time by the computing device, thereby conserving system resources of the computing device and preventing situations likely to cause the computing device to slow down, freeze, and/or crash.

Figure 1:
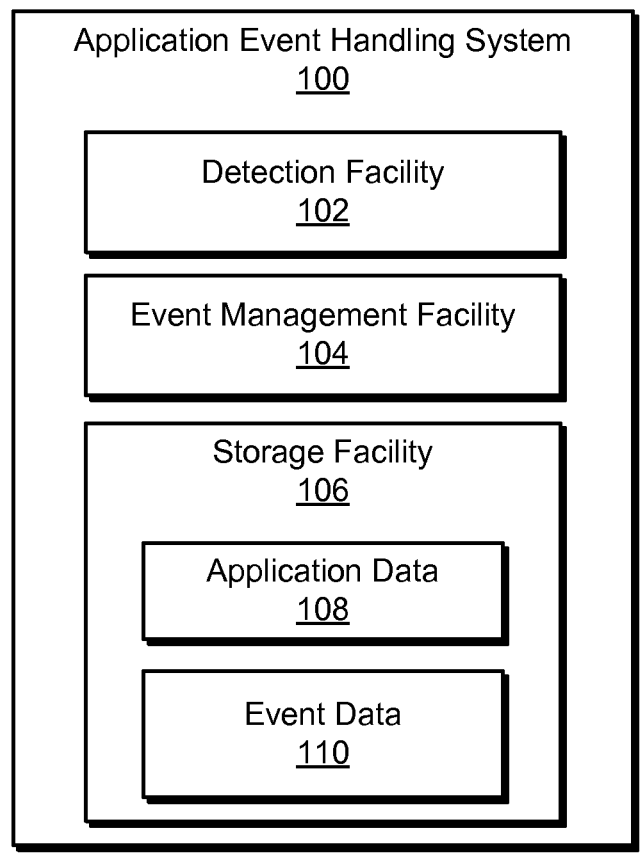
FIG. 1 illustrates an exemplary application event handling system according to principles described herein.

FIG. 1 illustrates an exemplary application event handling system 100 ("system 100"). As shown, system 100 may include, without limitation, a detection facility 102, an event management facility 104, and a storage facility 106 selectively and communicatively coupled to one another. It will be recognized that although facilities 102-106 are shown to be separate facilities in FIG. 1, any of facilities 102-106 may be combined into fewer facilities, such as into a single facility, or divided into more facilities as may serve a particular implementation.

Detection facility 102 may be configured to detect an occurrence of an application event initiated by a user and associated with an application configured to be executed by a computing device. As used herein, an "application event" or simply "event" may refer to any user-initiated event associated with an application configured to be executed by a computing device. For example, an event may include a docking of a mobile device (e.g., a mobile phone or a tablet computer) with a host device (e.g., a docking station), an undocking of a mobile device from a host device, a selection of a physical or virtual button associated with the computing device (e.g., a keystroke), and/or any other action performed by a user with respect to a computing device.

Detection facility 102 may detect an occurrence of an event initiated by a user in any suitable manner. For example, detection facility 102 may detect a communicative coupling of the computing device with a host device, a communicative decoupling of the computing device with the host device, a pressing of a button, and/or any other action that may be performed by a user to initiate an event.

Event management facility 104 may be configured to perform one or more event management operations. For example, in response to detection facility 102 detecting an occurrence of an event initiated by a user and associated with an application, event management facility 104 may determine whether another event previously initiated by the user and associated with the same application is either already being processed by the computing device or already scheduled for processing by the computing device. As used herein, a "processing" of an event by a computing device refers to the computing device performing one or more computing operations associated with the event. For example, a computing device may process an event by automatically performing one or more network initialization operations in response to an occurrence of the event (e.g., opening and/or closing one or more network connections), automatically performing one or more application operations in response to an occurrence of the event (e.g., opening or closing an application associated with the event), automatically performing one or more resource allocation operations (e.g., CPU and/or memory allocation operations) in response to an occurrence of the event, and/or performing any other type of computing operation associated with the event as may serve a particular implementation.

As mentioned, the computing device may already be processing a previously initiated event when the occurrence of the event is detected by detection facility 102. Alternatively, a previously initiated event may already be scheduled for processing by the computing device when the occurrence of the event is detected by detection facility 102. An event may be scheduled for processing in any suitable manner. For example, data representative of the event may be placed in a scheduled event queue. After a delay timer associated with the scheduled event queue expires, the computing device may be allowed to process the event. As will be described below, the processing delay caused by the delay timer may be configured to prevent system resources associated with the processing of events from being tied up while a plurality of events are initiated by a user in rapid succession.

If event management facility 104 determines that a previously initiated event is already being processed or scheduled for processing by the computing device when detection facility 102 detects an occurrence of an event, event management facility 104 may direct the computing device to ignore the previously initiated event. This may be performed in any suitable manner. For example, if the previously initiated event is already being processed by the computing device, event management facility 104 may direct the computing device to ignore the previously initiated event by terminating (e.g., directing the computing device to terminate) the processing of the previously initiated event. Termination of a processing of an event may be performed in any suitable manner. For example, event management facility 104 may terminate a processing of an event by interrupting the processing of the event and safely canceling the processing of the event in a manner that does not corrupt one or more applications being executed by the computing device and/or cause the computing device to crash.

Alternatively, if the previously initiated event is scheduled for processing by the computing device, event management facility 104 may direct the computing device to ignore the previously initiated event by canceling the scheduled processing of the previously initiated event. This may be performed in any suitable manner. For example, event management facility 104 may remove the previously scheduled event from the scheduled event queue.

Event management facility 104 may be further configured to schedule, in response to the determination that a previously initiated event is already being processed or scheduled for processing, the event detected by detection facility 102 to be processed by the computing device after a delay timer expires. Once the processing has been scheduled, event management facility 104 may start the delay timer. The delay timer may be configured by a programmer or user to expire after any suitable predetermined amount of time (e.g., two seconds) and may be configured to prevent system resources associated with the processing of the event from being used by the computing device while a plurality of events are initiated by a user in rapid succession.

For example, if detection facility 102 detects an occurrence of an additional event initiated by the user and associated with the application before the delay timer expires (i.e. while the delay timer is still running), event management facility 104 may cancel the scheduled processing of the event and place data representative of the newly detected additional event in the scheduled event queue. Event management facility 104 may then restart (i.e., reset and restart) the delay timer (expiration of which will allow the computing device to process the additional event). On the other hand, if the delay timer expires without detection facility 102 detecting an occurrence of an additional event initiated by the user and associated with the application, event management facility 104 may direct the computing device to process the event (e.g., automatically initiate performance of one or more computing operations associated with the event). By preventing the computing system from processing an event until after the delay timer expires, system resources involved in the processing of events may be conserved until it is more likely that additional events will not be immediately initiated by a user.

If, however, event management facility 104 determines that no other event previously initiated by the user and associated with the application is either already being processed or already scheduled for processing by the computing device when detection facility 102 detects an occurrence of an event, event management facility 104 may direct the computing device to automatically begin processing the event without waiting for the delay timer to expire. For example, the event may be the first event initiated by a user during a particular use session. By allowing the computing device to immediately process the event, event management facility 104 may facilitate a relatively quick response by the computing device to the user-initiated event.

Storage facility 106 may be configured to maintain application data 108 and event data 110. Application data 108 may be representative of one or more applications configured to be executed by a computing device. Event data 110 may be generated and/or utilized by event management facility 104. For example, event data 110 may include data representative or otherwise associated with one or more user-initiated events. It will be recognized that storage facility 106 may maintain additional or alternative data as may serve a particular implementation.

Figure 2:
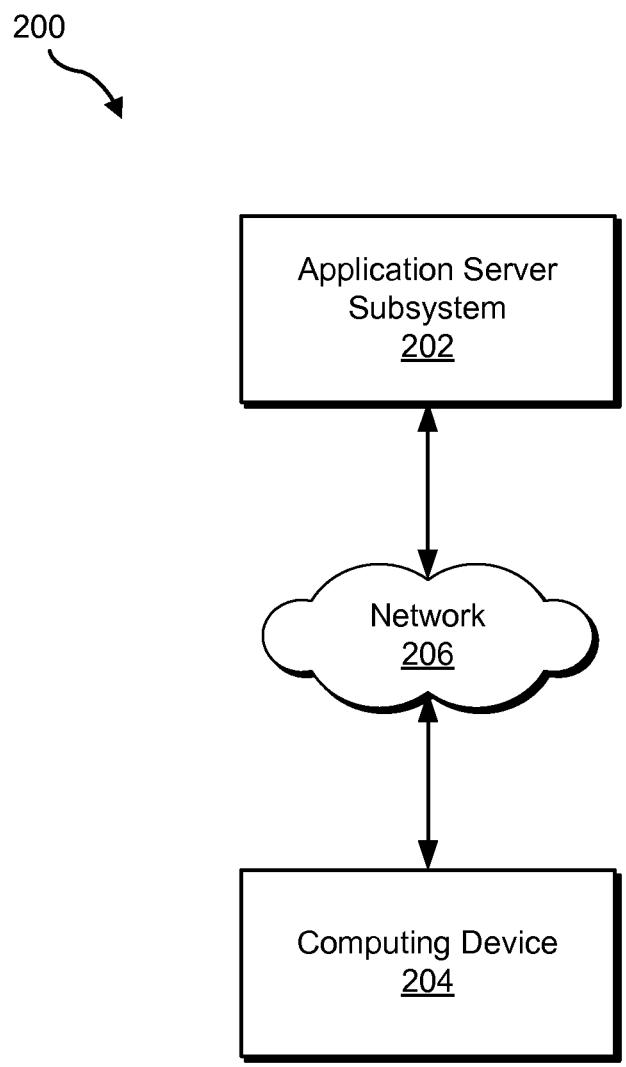
FIG. 2 illustrates an exemplary implementation of the system of FIG. 1 according to principles described herein.

FIG. 2 illustrates an exemplary implementation 200 of system 100 wherein an application server subsystem 202 is communicatively coupled to a computing device 204 by way of a network 206. As will be described in more detail below, detection facility 102, event management facility 104, and storage facility 106 may each be implemented by application server subsystem 202 and/or computing device 204.

Application server subsystem 202 may be associated with an application provider (e.g., a mobile application provider), a service provider (e.g., a subscriber television service provider, a mobile communications service provider, an Internet service provider, etc.), a media content program provider (e.g., ESPN, NBC, etc.), and/or any other type of application provider. Accordingly, application server subsystem 202 may be configured to provide one or more application services to computing device 204. For example, application server subsystem 202 may be configured to manage (e.g., maintain, process, distribute, and/or generate) applications configured to be delivered to and/or executed by computing device 204.

Application server subsystem 202 may be implemented by one or more computing devices as may serve a particular implementation.

Computing device 204 may be configured to access and/or execute one or more applications provided by application server subsystem 202. For example, computing device 204 may be configured to download an application (e.g., a mobile application) from application server subsystem 202 and then execute the application at the direction of a user.

Computing device 204 may be implemented by any suitable combination of computing devices. For example, computing device 204 may be implemented by one or more mobile devices (e.g., mobile phones and/or tablet computers), personal computers, set-top box devices, digital video recording devices, personal-digital assistant devices, gaming devices, television devices, etc.

Application server subsystem 202 and computing device 204 may communicate with one another using any suitable communication technologies, devices, media, and protocols supportive of data communications, including, but not limited to, socket connections, Ethernet, data bus technologies, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Evolution Data Optimized Protocol ("EVDO"), Time Division Multiple Access ("TDMA") technologies, Short Message Service ("SMS"), Multimedia Message Service ("MMS"), radio frequency ("RF") signaling technologies, wireless communication technologies (e.g., Bluetooth, Wi-Fi, etc.), in-band and out-of-band signaling technologies, and other suitable communications technologies.

Application server subsystem 202 and computing device 204 may communicate using any suitable network. For example, as shown in FIG. 2, application server subsystem 202 and computing device 204 may be configured to communicate with each other by way of network 206. Network 206 may include one or more networks or types of networks capable of carrying communications and/or data signals between application server subsystem 202 and computing device 204. For example, network 206 may include, but is not limited to, a cable network, an optical fiber network, a hybrid fiber coax network, a wireless network (e.g., a Wi-Fi and/or mobile telephone network), a satellite network, a wireless broadcast network (e.g., a satellite media broadcasting network or terrestrial broadcasting network), a subscriber television network, a provider-specific network, the Internet, an intranet, a local area network, any other suitable network, and/or any combination or sub-combination of these networks.

In certain embodiments, system 100 may be implemented entirely by application server subsystem 202 or by computing device 204. In other embodiments, components of system 100 may be distributed across application server subsystem 202 and computing device 204.

Figure 3:
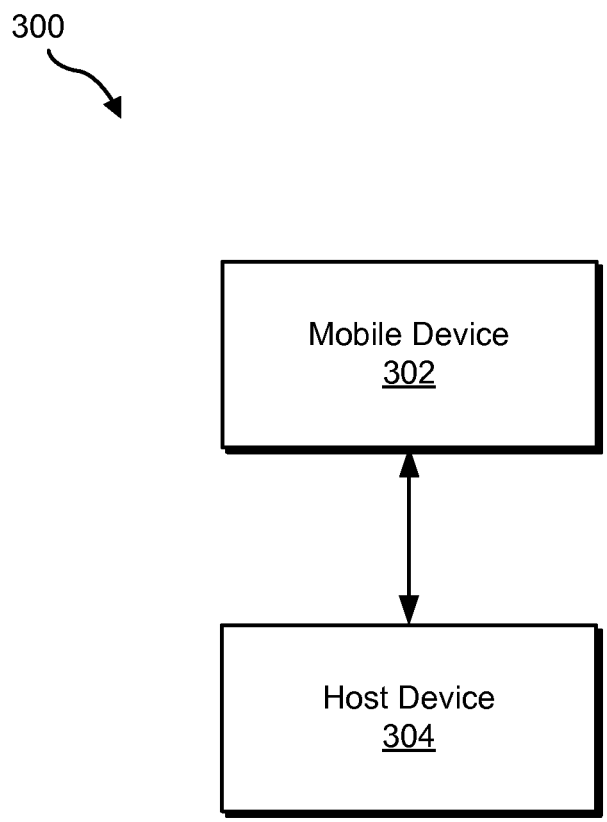
FIG. 3 illustrates another exemplary implementation of the system of FIG. 1 according to principles described herein.

FIG. 3 illustrates another exemplary implementation 300 of system 100. As shown, implementation 300 may include a mobile device 302 configured to be selectively and communicatively coupled to a host device 304. For example, mobile device 302 may be docked and/or undocked by a user with respect to host device 304.

Mobile device 302 may include any suitable mobile device configured to be communicatively coupled to host device 304. For example, mobile device 302 may include a mobile phone, a tablet computer, and/or any other type of mobile computing device as may serve a particular implementation. Host device 304 may include any suitable computing device configured to host mobile device 302. For example, host device 304 may include a docking station such as a mobile handset docking station.

In a docked state, mobile device 302 and host device 304 may be together configured to provide one or more computing functions not normally provided by mobile device 102 and/or computing device 104 individually. For example, host device 304 may be a mobile handset docking station and mobile device 302 may be a mobile phone. The mobile handset docking station may be located within an office, for example, and may be connected to a network by way of an Ethernet cable. A user may dock the mobile phone with the mobile handset docking station (e.g., by placing the mobile phone into a cradle or the like that is a part of the mobile handset docking station) in order to use the mobile phone as a traditional landline office phone. Upon docking the mobile phone with the mobile handset, an application (e.g., a SIP client) on the mobile phone may automatically create a network connection through the mobile handset docking station to a back-end telephone network and log the user in to the telephone network. The application may also set up various connections between the mobile phone and the mobile handset docking station so that signals (e.g., audio signals) may pass therebetween. Once all of these initialization operations have been performed by the application, the user may use the mobile phone in a similar manner as he or she would use an office phone. When the user undocks the mobile phone from the mobile handset docking station, the application residing on the mobile phone closes the network connection and the various connections between the mobile phone and the mobile handset docking station. The mobile phone may then return to its normal operating state.

Unfortunately, however, if the user rapidly performs a series of docking events (i.e., by rapidly and repeatedly docking and undocking the mobile phone with the mobile handset docking station), the mobile phone may slow down, freeze, or even crash as it attempts to process each event. Hence, as will be illustrated in more detail below, the methods and systems described herein may ensure that only the most recently initiated docking event is processed at any given time by the mobile device.

Figure 4:
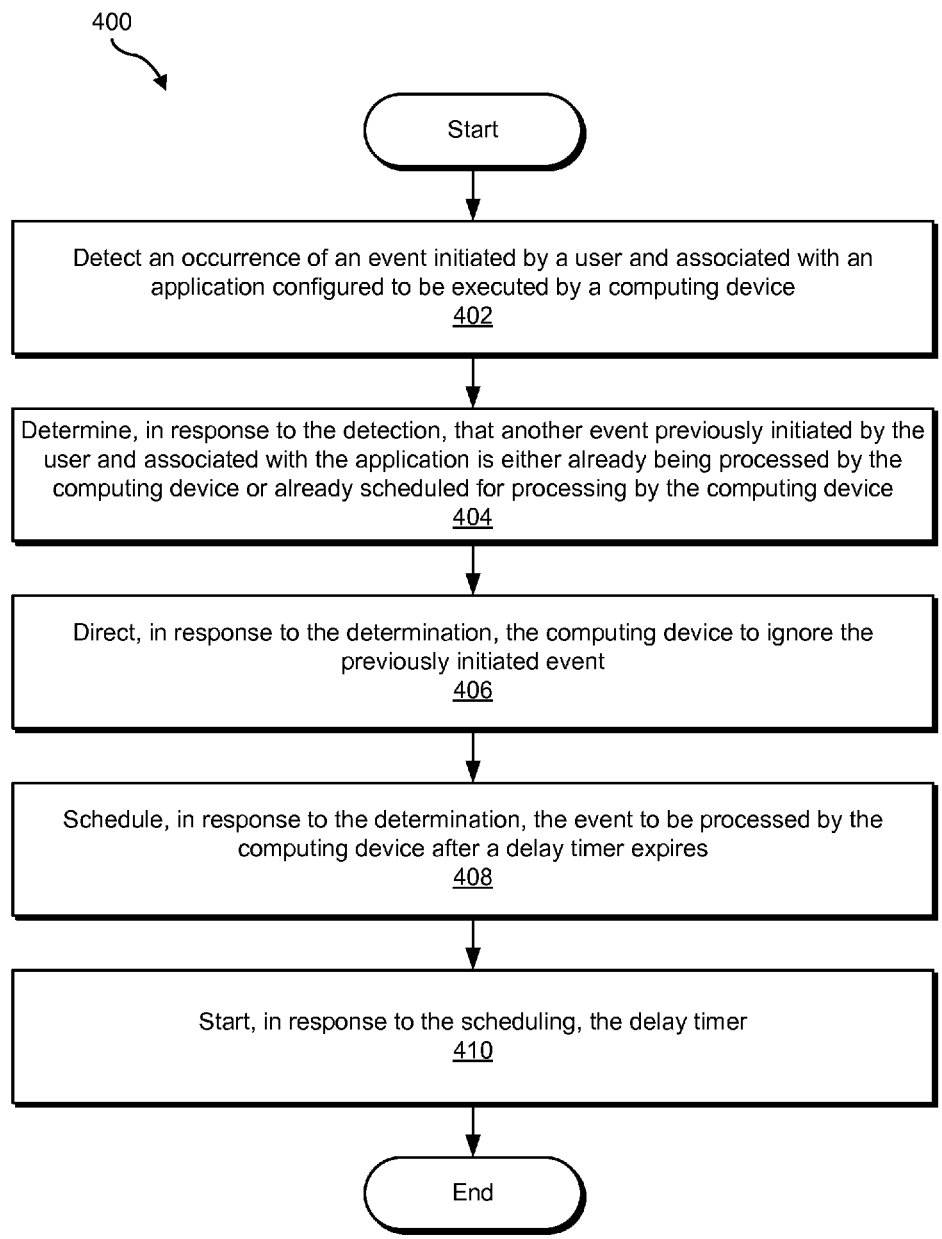
FIG. 4 illustrates an exemplary application event handling method according to principles described herein.

FIG. 4 illustrates an exemplary application event handling method 400. While FIG. 4 illustrates exemplary steps according to one embodiment, other embodiments may omit, add to, reorder, and/or modify any of the steps shown in FIG. 4. One or more of the steps shown in FIG. 4 may be performed by system 100 and/or any implementation thereof.

In step 402, an application event handling system detects an occurrence of an event initiated by a user and associated with an application configured to be executed by a computing device. Step 402 may be performed in any of the ways described herein.

In step 404, the application event handling system determines, in response to the detection of the occurrence of the event, that another event previously initiated by the user and associated with the application is either already being processed by the computing device or already scheduled for processing by the computing device. Step 404 may be performed in any of the ways described herein.

In step 406, the application event handling system directs, in response to the determination, the computing device to ignore the previously initiated event. Step 406 may be performed in any of the ways described herein.

In step 408, the application event handling system schedules, in response to the determination, the event to be processed by the computing device after a delay timer expires. Step 408 may be performed in any of the ways described herein.

In step 410, the application event handling system starts, in response to the scheduling, the delay timer. Step 410 may be performed in any of the ways described herein.

Figure 5:
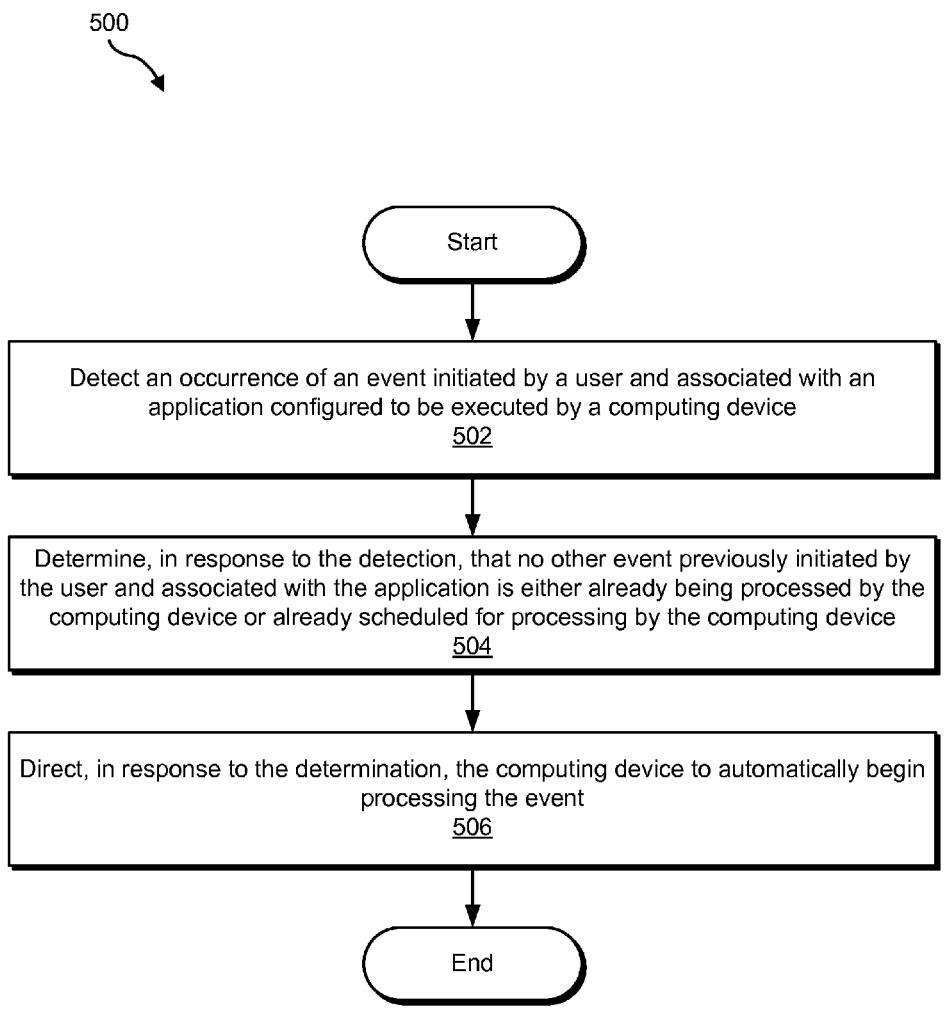
FIG. 5 illustrates another exemplary application event handling method according to principles described herein.

FIG. 5 illustrates another exemplary application event handling method 500. While FIG. 5 illustrates exemplary steps according to one embodiment, other embodiments may omit, add to, reorder, and/or modify any of the steps shown in FIG. 5. One or more of the steps shown in FIG. 5 may be performed by system 100 and/or any implementation thereof.

In step 502, an application event handling system detects an occurrence of an event initiated by a user and associated with an application configured to be executed by a computing device. Step 502 may be performed in any of the ways described herein.

In step 504, the application event handling system determines, in response to the detection, that no other event previously initiated by the user and associated with the application is either already being processed by the computing device or already scheduled for processing by the computing device. Step 504 may be performed in any of the ways described herein.

In step 506, the application event handling system directs, in response to the determination, the computing device to automatically begin processing the event. Step 506 may be performed in any of the ways described herein.

Figure 6:
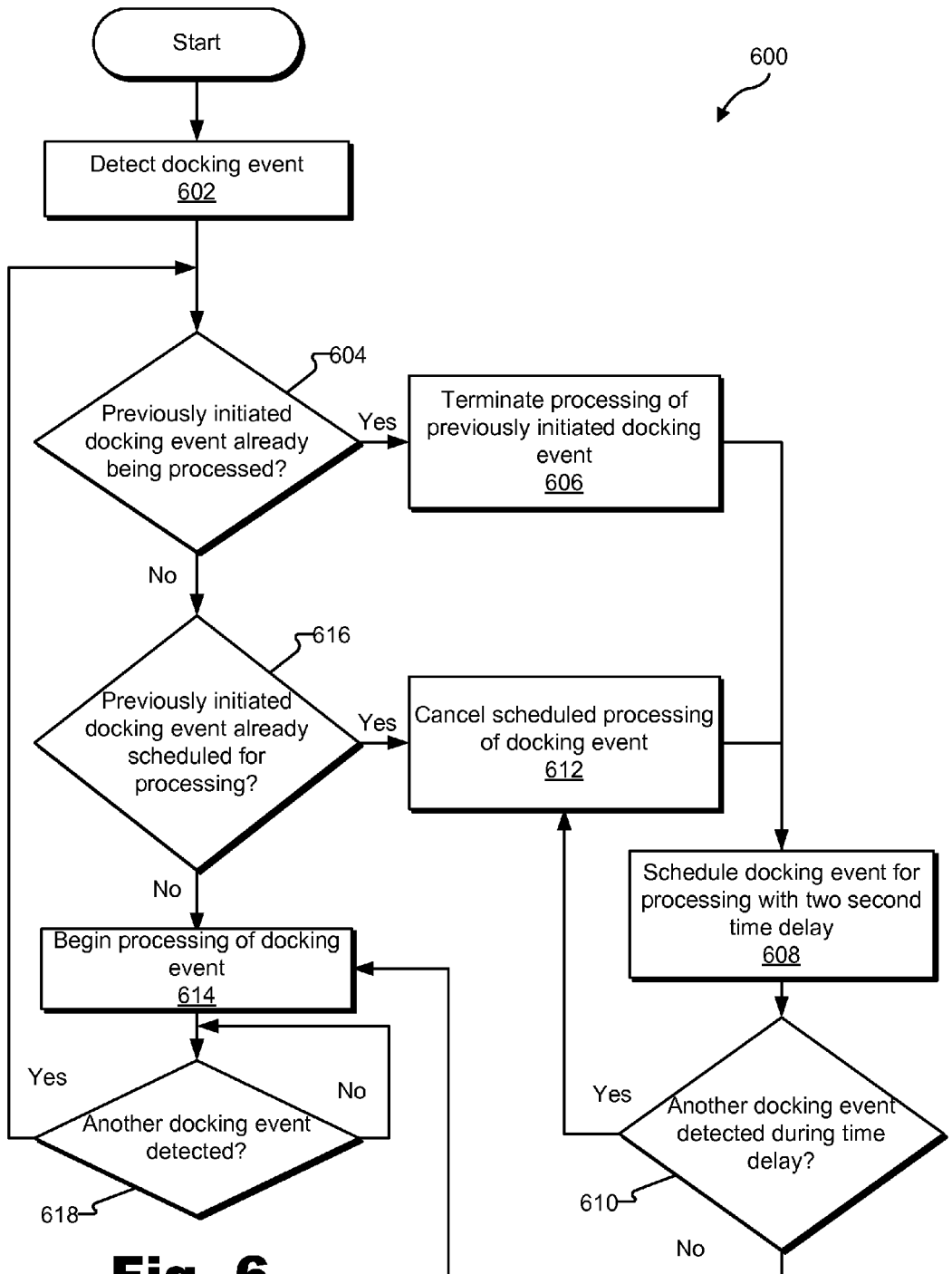
FIG. 6 illustrates an exemplary method of handling docking events performed by a user of a mobile device according to principles described herein.

An exemplary implementation of the systems and methods described herein will now be provided in connection with FIG. 6. FIG. 6 illustrates an exemplary method 600 of handling docking events performed by a user of a mobile device. For purposes of this example, it will be assumed that the docking events are performed by the user either docking a mobile device (e.g., a mobile phone) with a docking station (e.g., a mobile handset docking station) or undocking the mobile device from the docking station. The steps shown in method 600 are performed by the mobile device for illustrative purposes. It will be recognized that docking station may alternatively perform one or more of the steps shown in method 600 as may serve a particular implementation.

In step 602, a docking event is detected. For example, the mobile device may detect that the user has docked the mobile device with the docking station.

In decision block 604, the mobile device determines whether a previously initiated docking event is already being processed. If a previously initiated docking event is already being processed (Yes; decision block 604), the mobile device terminates the processing of the previously initiated docking event (step 606) and schedules the recently detected docking event for processing with a two second time delay (step 608). It will be recognized that the time delay may be for any other amount of time as may serve a particular implementation.

In decision block 610, the mobile device determines whether another docking event is detected during the time delay (i.e., before a delay time expires). If another docking event is detected (Yes; decision block 610), the mobile device cancels the scheduled processing of the docking event currently in the scheduled event queue (step 612). Alternatively, if another docking event is not detected during the time delay (No; decision block 610), the mobile device begins processing the docking event (step 614).

Returning to decision block 604, if a previously initiated docking event is not already being processed when a docking event is detected (No; decision block 604), the mobile device determines whether a previously initiated docking event is already scheduled for processing (decision block 616). If a previously initiated docking event is not already scheduled for processing (No; decision block 616), the mobile device begins processing the docking event (step 614) without a time delay. Alternatively, if a previously initiated docking event is already scheduled for processing (Yes; decision block 616), the scheduled processing of the previously initiated docking event is canceled (step 612) and the process proceeds to previously explained step 608.

The mobile device may process the docking event in step 614 in any suitable manner. For example, the mobile device may perform one or more computing operations associated with the docking event. In some examples, if the docking event is the same as the current docking status, the mobile device may not actually perform any computing operations in response to an occurrence of the docking event. For example, if the mobile device is already in a docked state (i.e., the mobile device has already opened one or more network connections and/or begun executing an application in response to a docking of the mobile device), and a subsequent docking of the mobile device is detected (e.g., after the user has quickly undocked and then re-docked the mobile device with the docking station), the mobile device may process the detected docking event by not performing any additional computing operations associated with the docking event.

After the mobile device has begun processing the docking event in step 614, the mobile device continues to monitor whether another docking event has occurred (decision block 618). If another docking event is detected (Yes; decision block 618), the process returns to previously explained step 604.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a CD-ROM, DVD, any other optical medium, a RAM, a PROM, an EPROM, a FLASH-EEPROM, any other memory chip or cartridge, or any other tangible medium from which a computer can read.

Figure 7:
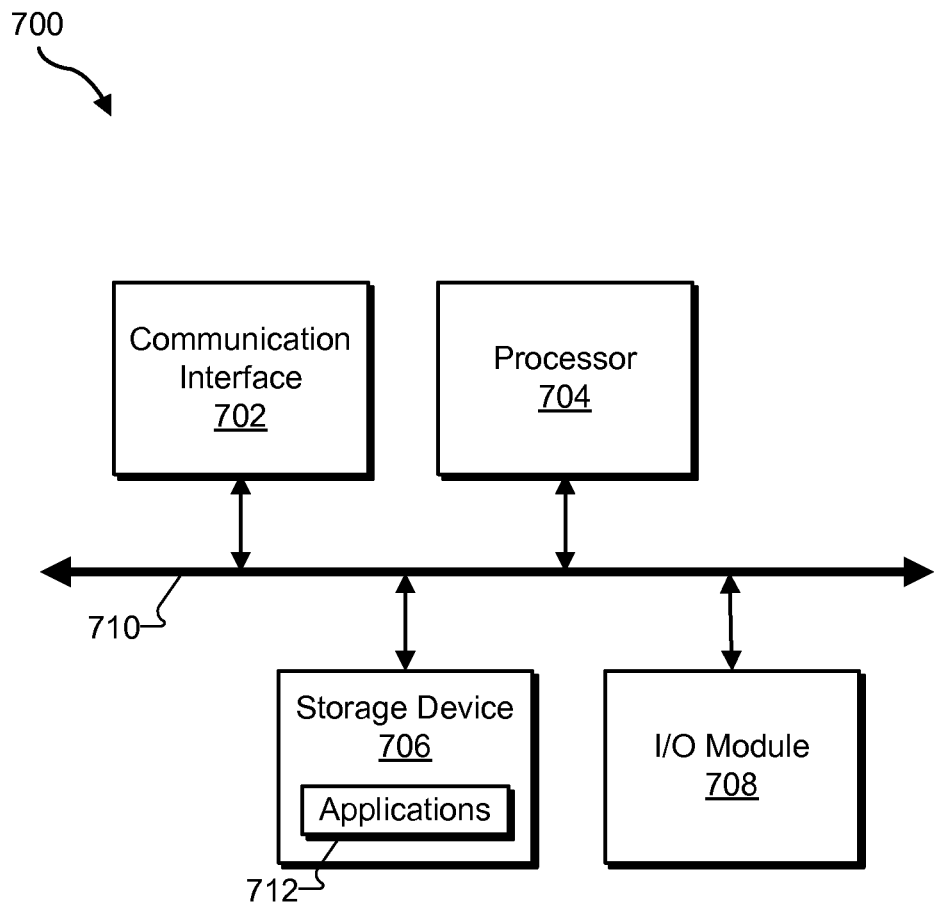
FIG. 7 illustrates an exemplary computing device according to principles described herein.

FIG. 7 illustrates an exemplary computing device 700 that may be configured to perform one or more of the processes described herein. As shown in FIG. 7, computing device 700 may include a communication interface 702, a processor 704, a storage device 706, and an input/output ("I/O") module 708 communicatively connected via a communication infrastructure 710. While an exemplary computing device 700 is shown in FIG. 7, the components illustrated in FIG. 7 are not intended to be limiting. Additional or alternative components may be used in other embodiments. Components of computing device 700 shown in FIG. 7 will now be described in additional detail.

Communication interface 702 may be configured to communicate with one or more computing devices. Examples of communication interface 702 include, without limitation, a wired network interface (such as a network interface card), a wireless network interface (such as a wireless network interface card), a modem, an audio/video connection, and any other suitable interface.

Processor 704 generally represents any type or form of processing unit capable of processing data or interpreting, executing, and/or directing execution of one or more of the instructions, processes, and/or operations described herein. Processor 704 may direct execution of operations in accordance with one or more applications 712 or other computer-executable instructions such as may be stored in storage device 706 or another computer-readable medium.

Storage device 706 may include one or more data storage media, devices, or configurations and may employ any type, form, and combination of data storage media and/or device. For example, storage device 706 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 706. For example, data representative of one or more executable applications 712 configured to direct processor 704 to perform any of the operations described herein may be stored within storage device 706. In some examples, data may be arranged in one or more databases residing within storage device 706.

I/O module 708 may be configured to receive user input and provide user output and may include any hardware, firmware, software, or combination thereof supportive of input and output capabilities. For example, I/O module 708 may include hardware and/or software for capturing user input, including, but not limited to, a keyboard or keypad, a touch screen component (e.g., touch screen display), a receiver (e.g., an RF or infrared receiver), and/or one or more input buttons.

I/O module 708 may include one or more devices for presenting output to a user, including, but not limited to, a graphics engine, a display (e.g., a display screen, one or more output drivers (e.g., display drivers), one or more audio speakers, and one or more audio drivers. In certain embodiments, I/O module 708 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 700. For example, one or more applications 712 residing within storage device 706 may be configured to direct processor 704 to perform one or more processes or functions associated with detection facility 102 and/or event management facility 104. Likewise, storage facility 106 may be implemented by or within storage device 706.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
   detecting, by an application event handling system, an occurrence of an event initiated by a user and associated with an application configured to be executed by a computing device;
   determining, by the application event handling system in response to the detecting, that another event previously initiated by the user and associated with the application is either already being processed by the computing device or already scheduled for processing by the computing device;
   directing, by the application event handling system in response to the determining, the computing device to ignore the previously initiated event;
   scheduling, by the application event handling system in response to the determining, the event to be processed by the computing device after a delay timer expires; and
   starting, by the application event handling system in response to the scheduling, the delay timer.

2. The method of claim 1, further comprising:
   detecting, by the application event handling system, an expiration of the delay timer; and
   directing, by the application event handling system in response to the detecting of the expiration of the delay timer, the computing device to process the event.

3. The method of claim 2, wherein the directing of the computing device to process the event comprises directing the computing device to automatically initiate performance of one or more computing operations associated with the event.

4. The method of claim 2, wherein the directing of the computing device to process the event comprises directing the computing device to automatically begin executing the application or to automatically close the application.

5. The method of claim 2, further comprising:
   detecting, by the application event handling system, that the computing device has completed processing the event;
   detecting, by the application event handling system after the computing device has completed processing the event, an occurrence of an additional event initiated by the user and associated with the application; and
   directing, by the application event handling system in response to the detecting of the occurrence of the additional event, the computing device to automatically begin processing the additional event.

6. The method of claim 1, further comprising:
   detecting, by the application event handling system after the starting of the delay timer and before the delay timer expires, an occurrence of an additional event initiated by the user and associated with the application;
   canceling, by the application event handling system in response to the detecting of the occurrence of the additional event, the scheduled processing of the event;

scheduling, by the application event handling system in response to the detecting of the occurrence of the additional event, the additional event to be processed by the computing device after the delay timer expires; and restarting, by the application event handling system in response to the scheduling of the processing of the additional event, the delay timer.

7. The method of claim 1, wherein the previously initiated event is already being processed by the computing device, and wherein the directing of the computing device to ignore the previously initiated event comprises terminating the processing of the previously initiated event.

8. The method of claim 7, wherein the terminating of the processing of the previously initiated event comprises:

interrupting the processing of the previously initiated event; and safely canceling the processing of the previously initiated event.

9. The method of claim 1, wherein the previously initiated event is already scheduled for processing by the computing device, and wherein the directing of the computing device to ignore the previously initiated event comprises canceling the scheduled processing of the previously initiated event.

10. The method of claim 1, wherein the scheduling of the event to be processed by the computing device after a delay timer expires comprises placing data representative of the event in a scheduled event queue associated with the delay timer.

11. The method of claim 1, wherein the delay timer is configured to expire after a predetermined amount of time.

12. The method of claim 1, wherein the event comprises a docking of the computing device with a host device.

13. The method of claim 1, wherein the event comprises an undocking of the computing device from a host device.

14. The method of claim 1, wherein the computing device comprises a mobile device and wherein the application comprises a mobile application.

15. The method of claim 1, embodied as computer-executable instructions on at least one non-transitory computer-readable medium.

16. A method comprising:

detecting, by an application event handling system, an occurrence of an event initiated by a user and associated with an application configured to be executed by a computing device;

determining, by the application event handling system in response to the detecting, that no other event previously initiated by the user and associated with the application is either already being processed by the computing device or already scheduled for processing by the computing device;

directing, by the application event handling system in response to the determining, the computing device to automatically begin processing the event;

detecting, by an application event handling system while the computing device is processing the event, an occurrence of an additional event initiated by the user and associated with the application;

terminating, by the application event handling system in response to the detecting of the occurrence of the additional event, the processing of the event;

scheduling, by the application event handling system in response to the detecting of the occurrence of the additional event, the additional event to be processed by the computing device after a delay timer expires; and starting, by the application event handling system in response to the scheduling, the delay timer.

17. The method of claim 16, embodied as computer-executable instructions on at least one non-transitory computer-readable medium.

18. A system comprising:

at least one computing device that comprises detection facility configured to detect an occurrence of an event initiated by a user and associated with an application configured to be executed by a computing device; and an event management facility communicatively coupled to the detection facility and configured to determine, in response to the detection, that another event previously initiated by the user and associated with the application is either already being processed by the computing device or already scheduled for processing by the computing device, direct, in response to the determination, the computing device to ignore the previously initiated event, schedule, in response to the determination, the event to be processed by the computing device after a delay timer expires, and start, in response to the scheduling, the delay timer.

19. The system of claim 18, wherein the event management facility is further configured to detect an expiration of the delay timer; and direct, in response to the detection of the expiration of the delay timer, the computing device to process the event.

* * * * *